Patented Nov. 22, 1932

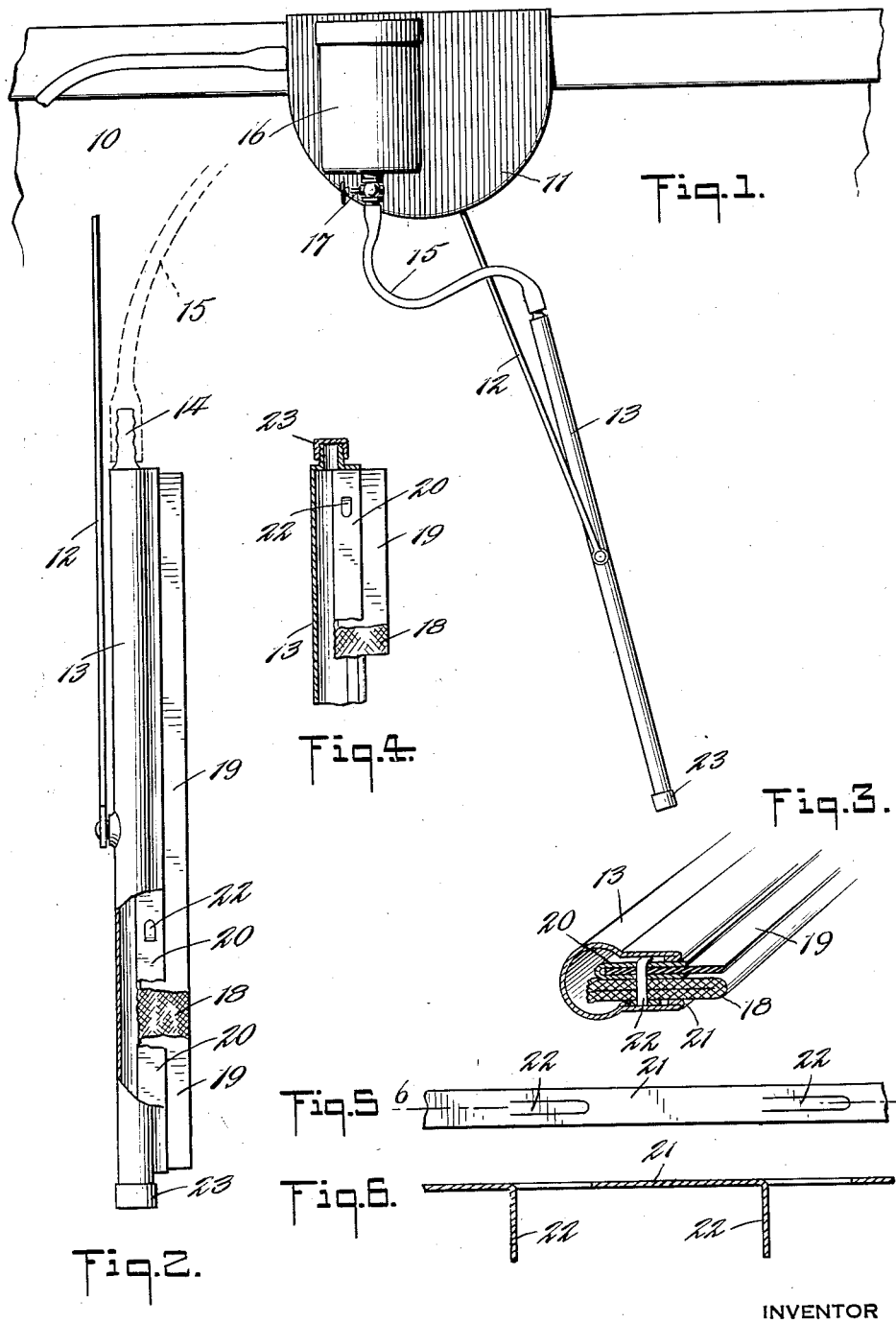

1,888,326

UNITED STATES PATENT OFFICE

JAMES H. MULLEN, OF JERSEY CITY, NEW JERSEY

WINDSHIELD WIPER

Application filed February 15, 1930. Serial No. 428,564.

This invention relates to a new and useful improvement in windshield wipers.

A main object of the invention is to provide a simple, compact, durable, and efficient wiper construction which will enable the operation of the wiper to keep the surface with which it co-operates clean even when the tendency of the surface is to freeze over with ice and sleet in extremely cold and wet weather.

A further object is to provide simple and efficient means whereby a dirty windshield may be quickly and easily cleaned merely by the operation of the wiper.

A further object is to ensure that the windshield is not only kept clean and clear but is also wiped as dry as possible immediately after being cleared and cleaned.

Further and more specific objects, features, and advantages will more clearly be apparent from the detailed description given below when taken in connection with the accompanying drawing which forms part of the specification and which illustrates one present preferred form of the invention.

The invention shown in the drawing and considered in general terms includes means whereby the moving wiper may be moistened with a liquid which will melt or soften any ice or sleet which may have formed on the outside of the glass. Preferably the moistening of the wiper takes place automatically as the wiper member swings across the surface to be cleaned. The wiper in this form is in the form partly of a wick which absorbs liquid from the tube on which it is supported and which is supplied with liquid from a suitable source such as a tank disposed within the car preferably near the wiper and the motor which operates it if the device is motor-operated. The wick spreads the melting or softening liquid on the glass and this is associated with an adjacent rubber element so that after the ice and sleet is softened and wiped away the surface may be dried as much as possible.

The invention further contemplates means whereby the wiper can act as a softener and melter of ice and sleet for a time without the use of an auxiliary tank. The member supporting the wiper element is a hollow tube and the wiper element is in the form of a wick which will absorb the liquid within the tube and transfer it to the wiped surface.

The invention is illustrated in the drawing, in which,

Fig. 1 is a partial elevation of the device attached to the windshield of an automobile;

Fig. 2 is a side elevation, partly in section, of the wiper element;

Fig. 3 is a perspective sectional view of the details of the wiper element;

Fig. 4 is a section of the tube construction details;

Fig. 5 is a partial plan view of the element connecting the wiper and dryer elements; and, Fig. 6 is a section taken on the line 6—6 of Fig. 5.

As shown in the drawing, the present preferred form of the invention has to do preferably with automobile windshields such as 10 on the top bar of which is disposed a frame 11 of a driving motor adapted in the usual manner to cause the oscillation of an arm 12 across the glass.

To this arm 12 there is pivotally connected a wiper means including a tube 13 the upper end of which is provided with a nipple 14 to receive one end of a flexible tube or hose 15. The other end of the hose 15 is connected to a similar nipple on the lower end of a tank or receptacle 16 which preferably altho not necessarily is disposed and supported from the frame 11 of the motor and thus makes a compact unit therewith. A valve 17 is disposed at the bottom of the tank 16 to control the flow of liquid in the tank 16 to the hose 15.

Preferably the tank 16 is filled with liquid such as glycerine or similar liquid which will act on ice and sleet to soften or melt the same so that the oscillating arm 12 and the wiper element may wipe the softened or melted material away and clear the glass so that the driver may see.

The wiper element besides the tube 13 comprises a wick element such as 18 of any suitable wick material which is particularly porous and preferably bent as shown in Fig. 3 so that the free and partly unravelled edges are presented to the interior of the tube 13. The tube 13 is preferably U-shaped and of resilient spring steel with the open edge receiving the wick 18 and the rubber element 19 which is made of any suitable preferably flexible material such as rubber and is separately encased in a metallic U-shaped frame 20 of thin steel or metal and thereby spaced a little distance from the sides of the wick element 18 so that the rubber will not become affected by the liquid in the wick.

The other side of the wick element 18 is strengthened by a reinforcing strip such as 21 of steel which has prongs such as 22 struck therefrom and bent at right angles to it to pierce the wick and the rubber element and to have their opposite free ends bent over the outer face of the casing or frame 20 as shown in Fig. 4. This construction will hold the wick and the rubber element compactly together and form an integral compact unit which may be readily and quickly removed from and inserted into the tube 13 as desired. The insertion of and holding of the tube 13 and wick and rubber unit together may take place in any desired manner and the free ends of the tube 13 are preferably spring steel to tightly clamp the wick and rubber unit along the sides thereof.

The bottom of the tube 13 may be closed by a cap such as 23 and the top may be also closed by a similar cap when the hose 15 is not connected thereto.

In the operation of the device, the tank 16 is filled with the desired liquid which preferably is glycerine or similar ice and sleet moistening and melting substance, and the valve 17 is opened whereupon the liquid will run down through the tube or hose 15 to the tubular wiper arm 13 and fill the same. The liquid in the arm 13 will ooze out through the wick 18 and affect the ice and sleet on the front of the glass 10 as the arm 12 is oscillated back and forth across the glass by the driving motor or the hand of the driver.

As the arm 12 thus moves the rubber element 19 will also wipe the glass dry and keep it clean to make for clear vision. It is of course possible to do without the tank 16 and to merely fill the tubular member 13 and then close both the top and bottom thereof with the caps 23. This provision would suffice for a time but would soon run out whereas the tank supply would last for a long time.

The unit comprising the rubber element and the wiper wick element can be readily taken out of the grip of the member 13 to be repaired and cleaned and re-assembled.

While the invention has been described in detailed manner and with respect to a present preferred form thereof it is not to be limited to such details and forms since many changes and modifications may be made and the invention embodied in other forms and modifications without departing from the spirit and scope of the invention in its broadest aspects. Hence it is desired to cover any and all forms and modifications which may come within the language or scope of any one or more of the appended claims.

What is claimed is:

1. A wiper element which comprises a tubular wiper member adaptable to contain liquid, having a longitudinal opening in one face, a U-shaped absorbent wick element projecting through said slot, with the folded edge extending outwardly to contact with the windshield, a rubber wiper element also extending from said slot adjacent the wick element and a metallic spacing means disposed between the rubber wiper element and wick element to space the same and metallic spacing means disposed between the tubular member, and the rubber wiper, and between the tubular member and wick element to space them respectively, from the tubular member.

2. A wiper element which comprises a tubular wiper member adaptable to contain liquid, having a longitudinal opening in one face, a U-shaped absorbent wick element projecting through said slot, with the folded edge extending outwardly to contact with the windshield, a rubber wiper element also extending from said slot adjacent the wick element and a metallic spacing means disposed between the rubber wiper element and wick element to space the same, and metallic spacing means disposed between the tubular member, and the rubber wiper, and between the tubular member and wick element to space them respectively, from the tubular member, and means extending from one of said last-mentioned metal spacing means through the intervening elements to be fastened to the other metal spacing means to form a compact, unitary, wiper device, which can be inserted in the longitudinal slot in the tubular member.

Signed at Jersey City in the county of Hudson and State of New Jersey this 13th day of February A. D. 1930.

JAMES H. MULLEN.